July 4, 1939. J. P. ROCK 2,164,840

BEARING FOR VEHICLES

Filed Nov. 30, 1937

Inventor
J. Paul Rock,
By Bernard F. Garvey
Attorney

Patented July 4, 1939

2,164,840

UNITED STATES PATENT OFFICE 2,164,840

BEARING FOR VEHICLES

John Paul Rock, Duluth, Minn.

Application November 30, 1937, Serial No. 177,359

3 Claims. (Cl. 267—52)

The present invention is a continuation in part of my application for Spring connections, filed July 1, 1937, Serial No. 151,475, and consists of a bearing for vehicles being especially adapted for interpositioning between the front axle spring and frame of the vehicle and secured to both the spring and frame.

Bearings of the same general construction of my invention are well known in the art, but in each instance the bolt bushing terminates within the sides of the channel frame of the vehicle with the result that the bolt is compelled to carry the body load. This condition, especially on trucks and like heavy vehicles, usually results in so called wheel "shimmy", frame twisting, spring breakage, etc., and frequently causes bolt shearing. I have found that by extending the bolt bushing through the channel frame, together with the bolt, and effecting a press fit between the bushing and frame, vibration, spring breakage and other undesirable conditions resulting from bolt failure, are eliminated.

Another object of this invention is to provide a bearing including a bolt bushing of suitable wear resisting material which may be compressed and spread under pressure of the bolt head and nut, against projecting terminals of the bushing, thereby effecting a positive lock between the bearing block and frame in addition to urging the bushing into fixed engagement with the bolt.

It is also an object of this invention to provide a bearing block the bolt bearing sleeve of which projects laterally beyond the sides of the spring, which provides spaces between the spring and frame sides into which the vertices of the spring U bolts may move, under action of the spring, this construction likewise preventing frictional contact of the spring sides and frame.

Figure 1:
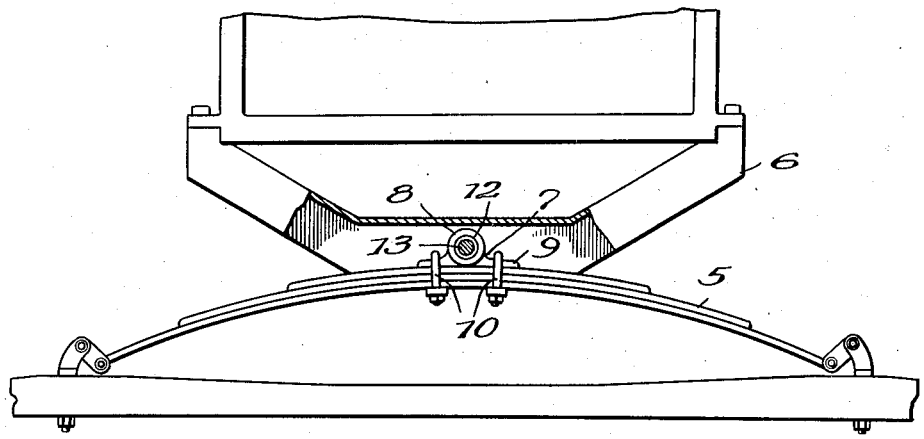
Figure 2:
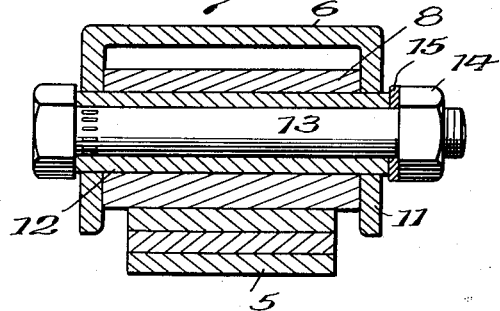
Figure 3:
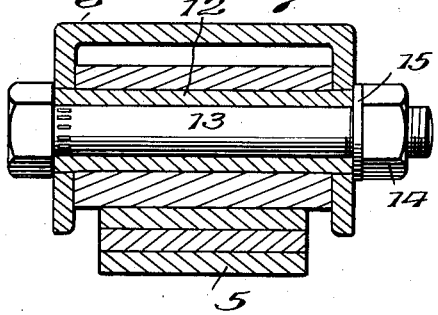
Figure 4:
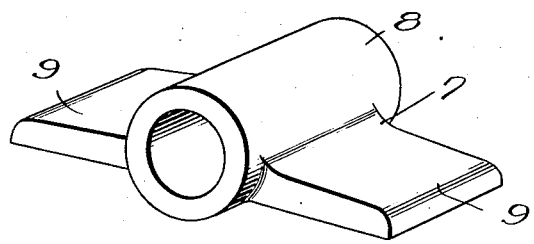

Other objects of the invention will be apparent from the following description of the present preferred form of the invention, taken in connection with the accompanying drawing, wherein:

Fig. 1 is an elevational view looking at one end of the bearing illustrating the application of the latter on a vehicle, Fig. 2 is a vertical sectional view of the bearing illustrating its application on a vehicle spring and vehicle frame showing the bushing before it is urged into fixed engagement with the frame and bolt, Fig. 3 is a similar view showing the bushing spread under pressure of the nut and bolt head, and Fig. 4 is a perspective view of the bearing block used in the present invention.

In order to illustrate the application of my invention, a cross vehicle spring 5 is illustrated and also a cross channel frame 6, both being of conventional design.

The bearing includes a block, generally designated 7, consisting of a cylindrical sleeve 8, the latter having peripheral flanges 9 extending therefrom, the ends of the sleeve projecting beyond the lateral margins of the flanges, as shown to advantage in Fig. 4. The block 7 is adapted to be superimposed on the spring 6, the width of the flanges 9 being coextensive with the width of the spring 5, the block being secured to the spring in any suitable manner, such as U-shaped bolts 10. When in this position the sleeve 8 of the block is positioned between the sides 11 of the frame 6, the terminals of the sleeve engaging the inner walls of the sides 11 with the bore of the sleeve in communication with openings formed in said sides. Said bore and openings are adapted for the reception of a bushing 12 which houses a bolt 13. As shown to advantage in Fig. 2, the ends of the bushing 12 normally extend beyond the outer walls of the sides 11. One end of the bolt head 13 engages one of the extended bushing terminals, while the opposite end is adapted to be engaged by a nut 14, which is threaded on the bolt, or by a washer 15 interposed between the nut and bushing terminal.

The bushing 12 is made of suitable wear resisting material, which is susceptible to spreading under compression, such for instance, as soft brass. I have found that in use of material of this kind when the nut is threaded inwardly on the bolt under pressure, the bushing is compressed causing it to spread into fixed engagement with the sides of the vehicle frame and the bolt. Not only does this secure the bolt and bushing from movement, but in addition all play between the frame and the bolt is eliminated correspondingly eliminating malperformance of the vehicle heretofore resultant from lost play due to wear on or shearing of the bolt.

By extending the sleeve 8 of the bearing block beyond the lateral margins of the flanges 9, and making the width of the latter coextensive with the width of the spring 5, the ends of the sleeeve extend beyond the lateral margins of the spring, as shown in Figs. 2 and 3 of the drawing. This provides a more substantial bearing surface at the point of pressure on the spring and additionally provides spaces between the opposite sides of the spring and the sides 11 of the frame into which the terminals of the U-shaped spring bolts 10 may move. Furthermore, by this construction the sides of the channel frame are spaced from the sides of the spring 5 to prevent contact with the latter.

After much experiment I have found that by extending the bushing 12 completely through the sides of the frame and making it of such a material that it can be spread by pressure on the nut 5 that friction between the frame and bolt is eliminated and crystallization of the metals correspondingly avoided. By the same token I have found that the bearing of the present invention may be used for an indefinite period of time on trucks, buses and the like of standard construction without spring breakage and improper vehicle performance heretofore due to bolt failure.

It is, of course, to be understood that I may make changes in the invention within the scope of the claims hereto appended.

What is claimed is:

1. In combination with a vehicle spring and channeled frame, a bearing block secured to the spring and positioned between the sides of the channeled frame, a bushing housed bolt, the bushing and bolt extending completely through said block and channel sides, and a nut threaded on said bolt for engagement with one end of the bushing, the bolt head engaging the opposite end of the bushing whereby pressure on the nut effect a spreading of the bushing into fixed engagement with the channel frame and bolt.

2. In combination with a vehicle spring and frame, a bearing block carried by and secured to the spring and positioned between parts of said frame, a bushing extending completely through said block and frame parts and projecting beyond the latter, a bolt sleeved through said bushing having its head impinging against one terminal of the bushing, and a nut threaded on said bolt and engaged with the opposite terminal of the bushing, inward movement of the nut on the bolt effecting a spreading of the bushing terminals.

3. In combination with a vehicle spring and channel frame, a bearing block secured to said spring and positioned between the sides of the channel frame, a bushing extending completely through said block and frame sides and projecting beyond the latter, and means extending through said bushing and engaged with the opposite ends of the latter for contracting the bushing terminals into engagement with said means and spreading said terminals into locking engagement with the frame sides.

JOHN PAUL ROCK.